US010362638B2

(12) United States Patent
Hoffstaedter et al.

(10) Patent No.: US 10,362,638 B2
(45) Date of Patent: Jul. 23, 2019

(54) PROCESS FOR PRODUCING A METAL PLATE HAVING AN EMBEDDED HEATING ELEMENT AND METAL PLATE PRODUCED THEREBY

(75) Inventors: Norbert Hoffstaedter, Icking (DE); Markus Spring, Eschlikon (CH)

(73) Assignee: ALINOX AG, Eschlikon (CH)

( * ) Notice: Subject to any disclaimer, the term of this patent is extended or adjusted under 35 U.S.C. 154(b) by 1737 days.

(21) Appl. No.: 13/816,514

(22) PCT Filed: Aug. 11, 2011

(86) PCT No.: PCT/EP2011/063858
§ 371 (c)(1),
(2), (4) Date: Apr. 9, 2013

(87) PCT Pub. No.: WO2012/022671
PCT Pub. Date: Feb. 23, 2012

(65) Prior Publication Data
US 2013/0186885 A1    Jul. 25, 2013

(30) Foreign Application Priority Data

Aug. 16, 2010   (DE) .................. 10 2010 037 005

(51) Int. Cl.
*H05B 3/30* (2006.01)
*B23K 20/02* (2006.01)
(Continued)

(52) U.S. Cl.
CPC ............. *H05B 3/30* (2013.01); *B23K 20/023* (2013.01); *B23K 20/04* (2013.01); *B23K 35/002* (2013.01);
(Continued)

(58) Field of Classification Search
USPC ........................................... 219/537
See application file for complete search history.

(56) References Cited

U.S. PATENT DOCUMENTS 1,392,416 A    10/1921  Henderson
2,468,206 A     4/1945  Keene et al.
(Continued)

FOREIGN PATENT DOCUMENTS

CN    101 574 861    11/2009
DE       2544359     4/1976
(Continued)

OTHER PUBLICATIONS

Diffusion Bonding, University of Cambridge, Amir Shirzadi, 2005.*

*Primary Examiner* — Anne M Antonucci
*Assistant Examiner* — Renee LaRose
(74) *Attorney, Agent, or Firm* — Grogan, Tecillo & Vanderleeden, LLP

(57) ABSTRACT

A description is given of a process for producing a metal plate having at least one embedded heating element and of the metal plate produced by the process. The heating element is arranged between two plate bodies, and the heating element is embedded in the plate bodies by rolling with material displacement. The adjacent sides of the plate bodies have a layer of aluminum or an aluminum alloy. After a heat pre-treatment at the re-crystallization temperature of the aluminum or the aluminum alloy, the plate bodies are pressed against one another to bring about a reduction in thickness, with which the plate bodies form a diffusion bond with one another and are integrally bonded to one another over the entire surface area thereof to form the metal plate to be produced. The process produces a metal plate as a whole with better thermal conductivity and a broader spectrum of use.

23 Claims, 8 Drawing Sheets

Figure 5:
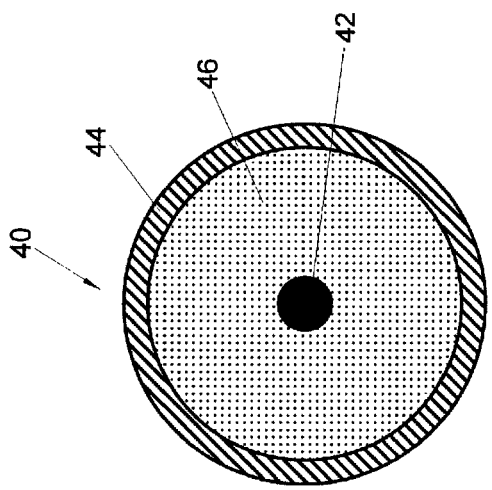

(51) Int. Cl.
*B23K 20/04* (2006.01)
*B23K 35/00* (2006.01)
*B23K 35/28* (2006.01)
*H05B 3/44* (2006.01)
*B23K 101/14* (2006.01)
*B23K 101/18* (2006.01)
*B23K 101/34* (2006.01)

(52) U.S. Cl.
CPC ............ *B23K 35/286* (2013.01); *H05B 3/44* (2013.01); *B23K 2101/14* (2018.08); *B23K 2101/18* (2018.08); *B23K 2101/34* (2018.08)

(56) References Cited

U.S. PATENT DOCUMENTS

| | | |
|---|---|---|
| 2,718,690 A | 5/1950 | Ulam |
| 3,210,840 A | 10/1965 | Ulam |
| 3,261,724 A | 7/1966 | Ulam |
| 3,350,772 A | 11/1967 | Ulam et al. |
| 3,920,175 A | 11/1975 | Hamilton et al. |
| 3,927,817 A | 12/1975 | Hamilton et al. |
| 4,332,080 A * | 6/1982 | Bleckmann ............ B21D 39/03 165/171 |
| 4,820,355 A | 4/1989 | Bampton |
| 4,934,581 A | 6/1990 | Gerhard et al. |
| 6,147,334 A * | 11/2000 | Hannigan ......... H01L 21/67103 118/725 |
| 6,579,431 B1 * | 6/2003 | Bolcavage ........... B23K 20/021 204/298.12 |
| 2010/0297463 A1 | 11/2010 | Hoffstaedter et al. |

FOREIGN PATENT DOCUMENTS

| | | |
|---|---|---|
| DE | 2461249 | 6/1976 |
| DE | 3810865 | 10/1988 |
| DE | 201 08 963 | 8/2001 |
| DE | 20108963 U1 * | 8/2001 |
| DE | 102007054071 | 5/2009 |
| EP | 0031866 | 7/1981 |
| EP | 1553863 | 7/2005 |
| FR | 2 698 582 | 6/1994 |
| JP | S63242635 A | 10/1988 |
| JP | 2000208134 A | 7/2000 |
| JP | 2003057458 A | 2/2003 |
| JP | 2004071363 A | 3/2004 |
| JP | 2010129289 * | 6/2010 |

\* cited by examiner

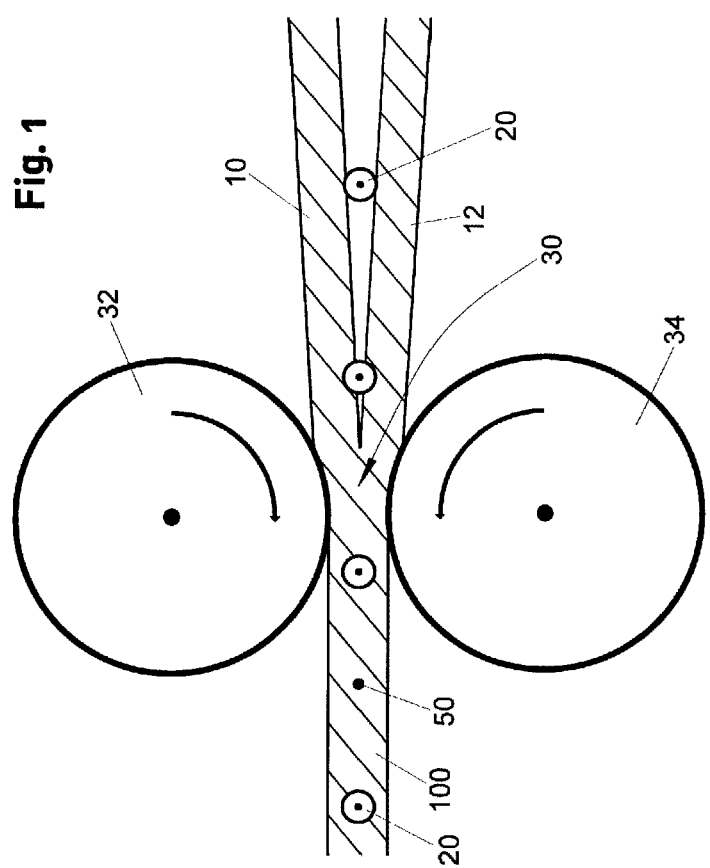

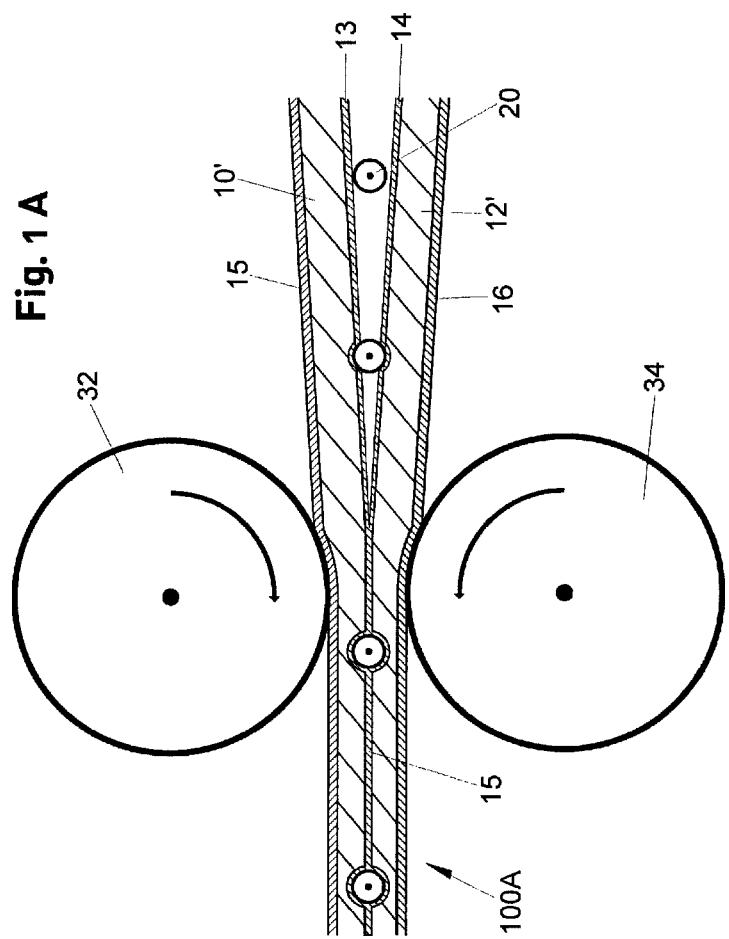

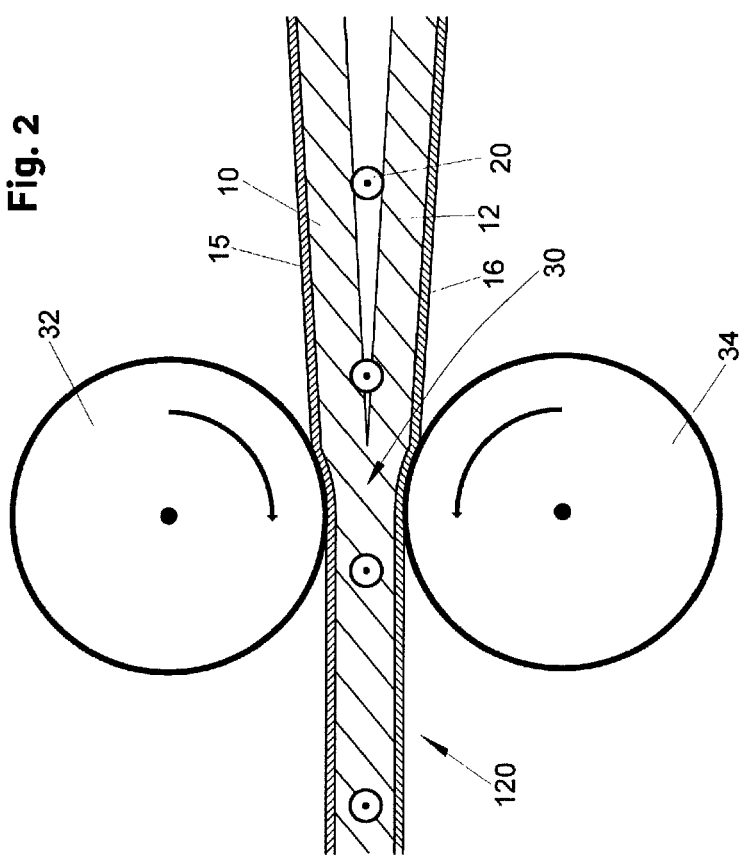

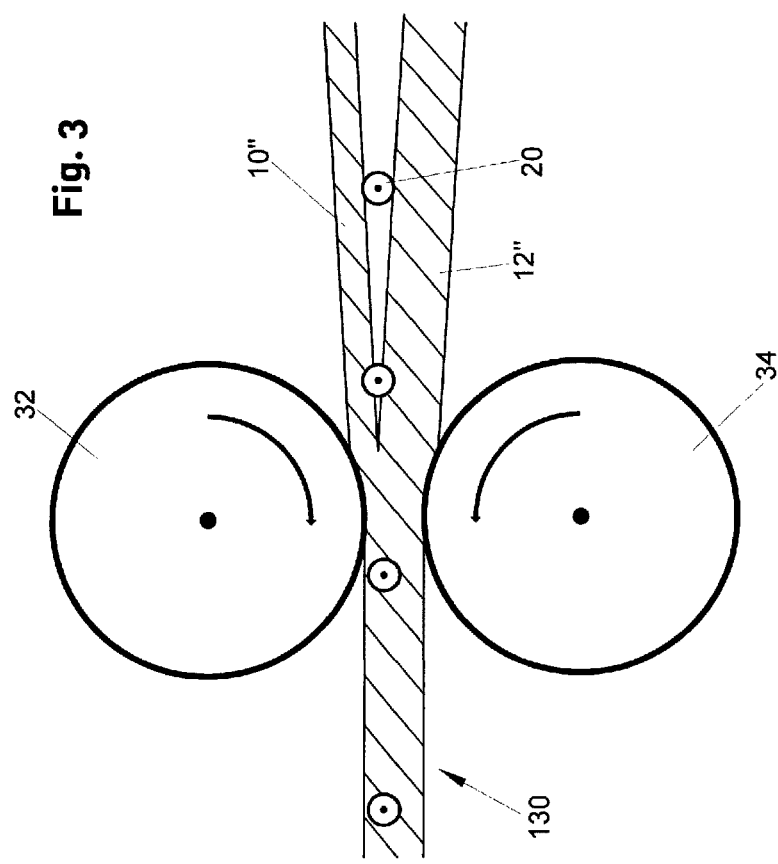

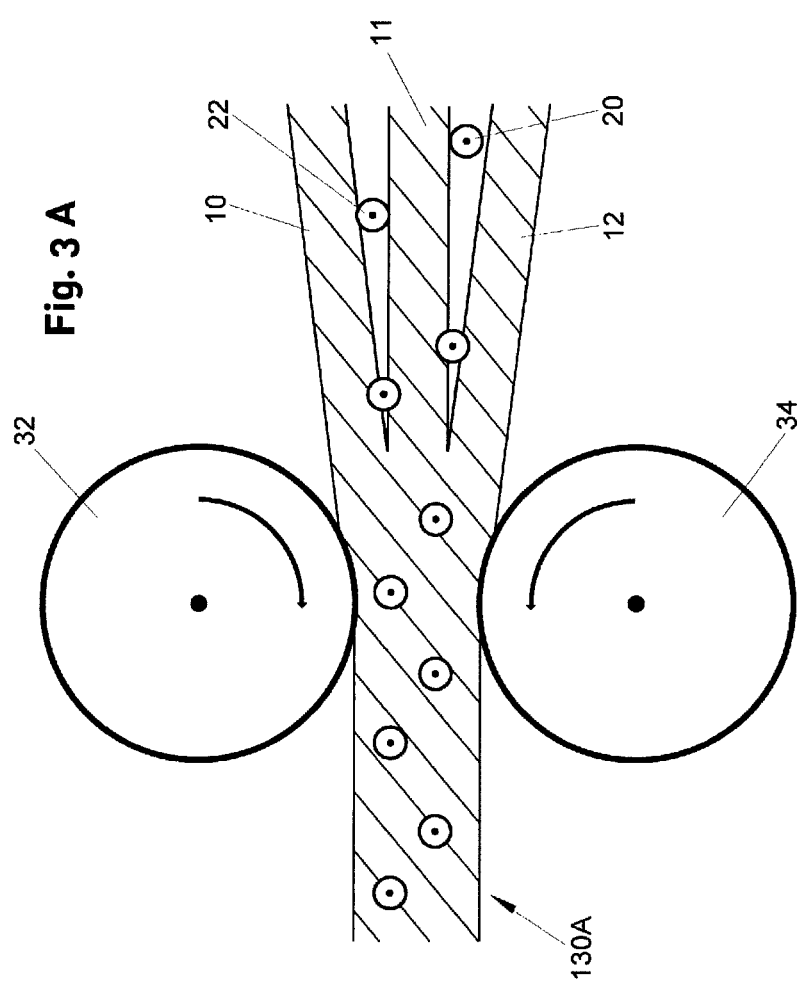

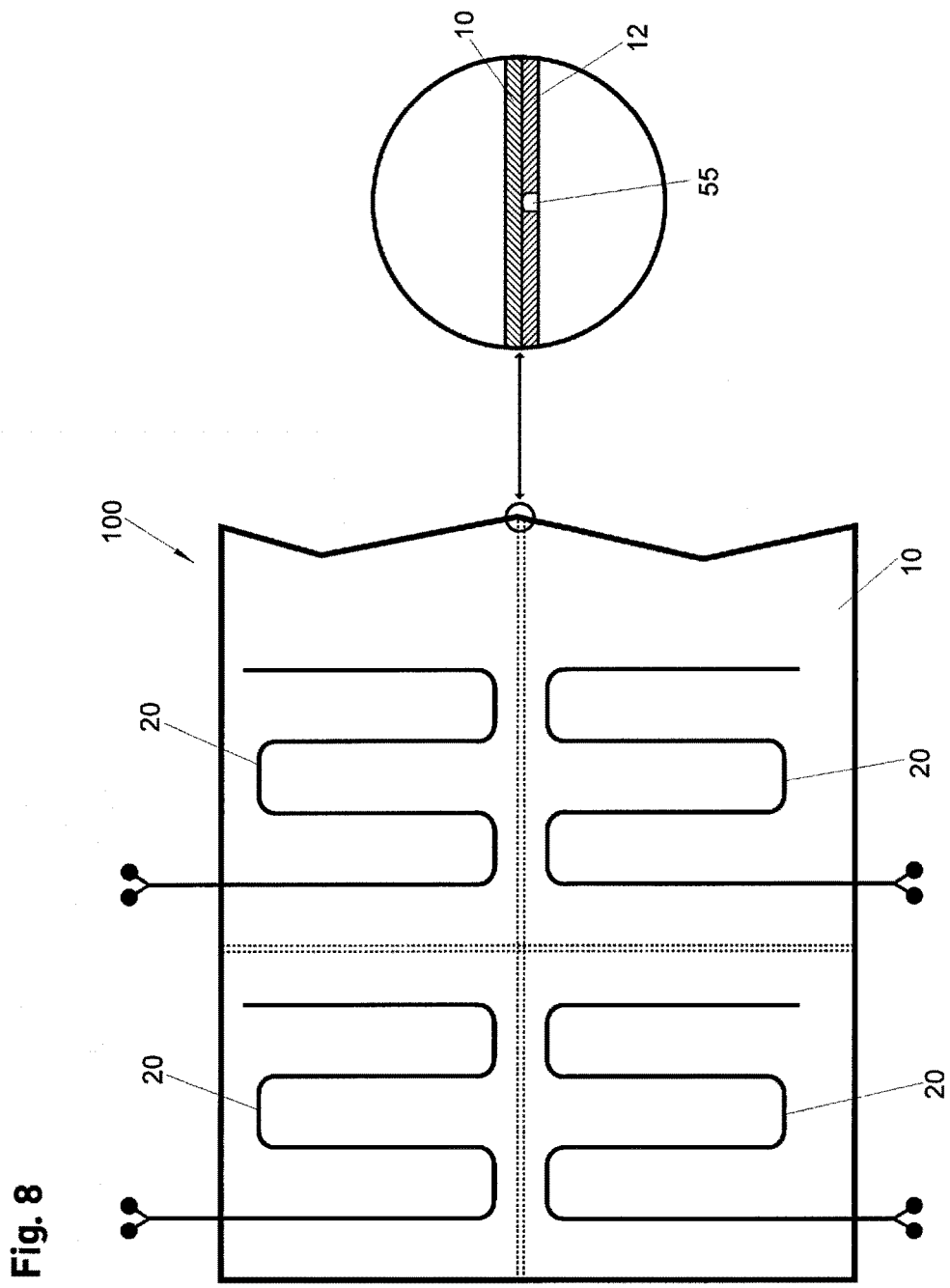

PROCESS FOR PRODUCING A METAL PLATE HAVING AN EMBEDDED HEATING ELEMENT AND METAL PLATE PRODUCED THEREBY

CROSS-REFERENCE TO RELATED APPLICATIONS

This application is entitled to the benefit of and incorporated by reference in their entireties essential subject matter disclosed in International Application No. PCT/EP2011/063858 filed on Aug. 11, 2011 and German Patent Application No. 10 2010 037 005.3 filed Aug. 16, 2010.

The invention relates to a method for producing a metal plate having an embedded heating element by means of the following steps:
 a) arranging at least one heating element between at least two plate bodies not provided with recesses for accommodating the or each heating element,
 b) embedding the or each heating element in direct contact in at least two plate bodies by compressing and material displacement of the plate bodies, and
 c) at least partly positively bonded interconnection of the plate bodies.

Furthermore, the invention relates to a metal plate produced by means of this or a similar method from at least two plate bodies not provided with recesses in which at least one heating element was embedded only by material displacement.

One such method and one such metal plate are known from the document DE 201 08 963 U1. In this known method, the two plate bodies are heated, for aluminium, for example, to 400° C., and compressed so tightly that the heating elements are embedded therein. The adjacent boundaries of the two plate bodies are then in two-dimensional contact and are connected to each other by means of a plurality of rivets so that they remain in bilateral contact. It is also contemplated to interconnect the two plate bodies by means of a high-temperature resistant plastic material. Further, there is also the possibility to bend the metal plate compressed in a flat state to a cylindrical, almost closed ring or tubular body. In the process, at least the terminal edges of the two plate bodies facing each other are fixedly connected to each other by means of a welding seam, i.e., partly positively bonded, and/or by means of a rivet so that the ends of the metal plates do not gape open in these positions. It is problematic for the metal plate produced in this way that while an optimum heat transfer from the heating element to the plate bodies is indeed ensured, an air gap affecting the heat conduction from plate body to plate body or generally in the direction of the thickness of the metal plate in the finished metal plate is present at the boundaries of the two plate bodies contacting each other. Here, the thermal conduction in the indicated direction is affected, irrespective of whether an air gap is present between the boundaries facing each other or the two plate bodies are connected to each other by a high-temperature resistant plastic material at their boundaries.

From the document DE 24 61 249 A1, a method for fixing connecting links to a metal part made of a plastically deformable material using bonding pressure is known. The connecting links consist of a harder material than the metal part. If a bonding pressure exceeding the flow limit of the metal parts is applied, the connecting links will penetrate the metal part to an extent that their largest cross-section is located at a distance to the surface of the metal part and that thereafter, by further applying the bonding pressure indirectly or directly to the closest vicinity of the penetrating positions under a further flow of the material of the metal parts, the penetrating positions are closed behind the connecting links which have penetrated or are reduced to such an extent that the connecting links are non-positively anchored in the metal part. Between the metal parts, one or more wire helixes are inserted which are made of a harder material than the metal parts (e.g., sheets) and which are pressed onto each other. The tips of the wire helixes alternately penetrate the material of the one or the other metal part, the bonding pressure being selected so high that the material of the metal parts flows into the space behind the tips of the wire helixes. The wire helixes are arranged around wires or ribbons. These measures serve the purpose to place a tubular heating element in a tight and good heat-conducting connection to a plate. However, they are also not suitable to prevent an unavoidable air gap between the two metal parts and the associated impairment of the thermal conductivity between the two metal parts.

The document EP 0 031 866 B1 relates to a method for producing a heating device or a heat exchanger unit around which a wire is helically wound so that the coil tips penetrate the material of a bearing plate when pressed on. The air gap resulting from the application of the method according to the aforementioned document DE 24 61 249 A1 and affecting the thermal conductivity will also result from the application of the method according to the document EP 0 031 866 B1.

From the document DE 10 2007 054 071 B4 a method for producing a strip or plate-like composite metal object of at least two layers of aluminium or an aluminium alloy is known in which a layer provided with strip-shaped recesses on its side facing an adjacent layer is used as one of the layers. A tubular body can be placed in these recesses. The tubular body is then embedded in the metal by one or more metal layers by compression. Before or after pressing, another body, e.g., a heating wire, may be inserted into the tubular body. In this case, an air gap is then present between the heating wire and the tubular body. The layers of aluminium or an aluminium alloy, with the exception of the contact point between the layers and the heating element, are, in fact, connected to each other in a positively bonded manner over the entire surface by means of a bilateral diffusion bond. However, the production of the strip or plate-like compound metal object requires that the strip-like recesses accommodating the tubular body are produced beforehand in at least one of the layers.

It is the object of the invention to improve a method and a metal plate of the type mentioned in the beginning so that the metal plate has an improved overall thermal conductivity and a wider range of application.

Based a method of the type mentioned in the beginning, the object is solved according to the invention by at least two plate bodies having at least one layer of aluminium or an aluminium alloy on their sides facing each other, respectively, being thermally pre-treated at a temperature at least identical to the re-crystallisation temperature of the aluminium or the aluminium alloy and subsequently pressed by rolling to effect the embedding of the or each heating element in the plate bodies and a reduction of the thickness of the layers during which the layers enter into a bilateral diffusion bond in the area of their contacting sides, and the plate bodies are thereby joined together in a positively bonded manner over their entire surface to form the metal plate to be produced.

Based on a metal plate of the type mentioned in the beginning, the object is solved according to the invention by the plate bodies being provided, on their sides facing each other, respectively, with at least one layer of aluminium or an aluminium alloy which are, with the exception of the contacting points between plate bodies and heating element(s), connected to each other in a positively bonded manner over their entire surface by means of a bilateral diffusion bond.

The positively bonded connection according to the invention in the metal plate connects the plate bodies over their entire surfaces on their sides facing each other so that the finished metal plate has no air gap whatsoever which might affect the thermal conductivity. When the method according to the invention is applied, this is rendered possible by the reduction of the thickness of the layers which enter into the desired bilateral diffusion bond converting the two plate bodies into an integral metal plate comprising an embedded heating element at the re-crystallisation temperature.

In the method according to the invention, the two plate bodies having no recesses for the or each heating element are pressed against each other by being rolled. The plate bodies between which the or each heating element is inserted are fed through a roll gap in which compressive forces act on each plate body along a rolling line. This results in that only small forces act on the or each heating element when it is embedded in the plate bodies. The surface on which the rolls come to act at all is at most equivalent to approximately one twelfth of the circumference of each roll defining the roll gap. The surface on which pressure is applied to the plate bodies is, accordingly, substantially smaller than in the known method according to the aforementioned document DE 201 08 963 U1 in which a pressing force is applied to the entire surface of the plate bodies.

The reduction of the thickness of at least two layers of aluminium or an aluminium alloy resulting from the method according to the invention and leading to their bilateral diffusion bond is based on a known metal plating method.

From the basic U.S. Pat. No. 2,718,690 A by John B. Ulam from the year 1955 which, in turn, is based on the landmark U.S. Pat. Nos. 1,392,416 A and 2,468,206 A from the years 1921 and 1949, respectively, a method is known by which plated metal can be produced. In this known method, no type of binding material is used between the individual metal layers. Rather, the molecular structures of the metals are interconnected. The individual metal layers are cleaned by a mechanical treatment to free their surfaces of any oxides, contamination, or the like. This is necessary to expose the molecular lattice structure of the metal. The metal layers are then heated to the appropriate temperature so that the adjacent surfaces of the metals can diffuse into each other by the application of pressure.

The invention makes advantageous use of the known method to embed a heating element in a metal plate not provided with recesses and to prevent the presence of any air gaps in the finished metal plate.

Advantageous embodiments of the invention are the subject matter of the subclaims.

In one embodiment of the method according to the invention, the reduction of the thickness of the layers of aluminium or an aluminium alloy amounts to a maximum of 25% in relation the overall thickness of these layers measured prior to being pressed onto each other. This thickness reduction and the rolling force required to this end are sufficiently large so that a bilateral diffusion bond of the layers can be achieved without fail.

In another embodiment of the method according to the invention, the layers of aluminium or an aluminium alloy are arranged as core layers between two cover layers of another metal such as steel, stainless steel, copper or titanium. By using appropriate cover layers, the method can be optimally customised to the intended use of the metal plate, for example with respect to a corrosion-resistant application, a heat-resistant application, a food-resistant application, a saltwater-resistant application or the like.

In another embodiment of the method according to the invention, the metal plate is brought into a state in which it can be further processed by mechanic reshaping. In this way, for example, differently shaped heating plates can be produced from the metal plate without the serviceability of the or each heating element being affected.

In another embodiment of the method according to the invention, at least one row of separate heating elements is embedded in the plate bodies. In this way, long metal plates comprising a large number of consecutively arranged separate heating elements or one heating element continuously extending across the length of the metal plate can be produced in a continuous rolling process.

In another embodiment of the method according to the invention, at least one temperature sensor per heating element is also embedded in the plate bodies. Later on, this will facilitate the temperature control of the metal plate according to the invention if it is, for example, used as a heating plate.

In another embodiment of the method according to the invention, a tubular heating element is used as the or each heating element in which at least one heating conductor is embedded in a mineral core enclosed by a tubular metallic sheath so that no air gap is present between the heating element and the heating element tube. In this embodiment, the electric insulation of the heating conductor and a good heat transfer to the tube are permanently ensured, and short circuits within the metal plate are excluded. In addition, short circuits between a plurality of heating conductors embedded in the tubular metallic sheath are avoided, i.e., their bilateral electric insulation is also permanently ensured.

In another embodiment of the method according to the invention, a notch is incorporated in one of the plate bodies during or after rolling to thermally separate at least one heating element from an existing adjacent heating element. In this way, numerous heating elements can be embedded in a metal plate in a simple manner in a continuous rolling process. When the finished metal plate is then cut into individual heating element groups, the heating elements within each heating element group are thermally separated from each other. Such a heating element group may, for example, replace a ceramic glass cooktop which, to date, is inductively heated or heated by means of radiation-type heating elements. Usefully the metal plate will, in this case, have a cover layer of stainless steel at least on the upper surface, and the notch will extend to the vicinity of the lower side of this cover layer or to its bottom side. Here a design for a cooling and heating plate known from the document EP 1 553 863 B8 is used.

In another embodiment of the method according to the invention, the or each heating element is arranged between the plate bodies so that it is helically wound or wound in a meandering pattern. In this way, individual heating plates can also be readily produced and electrically connected. Preferably, heating elements would be used here in which at least two heating conductors are embedded. The meander or the helix of the heating elements may thus simply end within the metal plate.

In another embodiment of the method according to the invention, the or each heating element is embedded eccentrically in relation to the thickness of the metal plate. This is advantageous in that the or each heating element is embedded closer to the surface(s) at which the heat is needed. In this way, the heat is generated directly under the surface(s) where it is needed. In case of a heating panel, it may be both surfaces which are to radiate heat. For this purpose an arrangement of the heating elements in the metal plate in at least two eccentric layers is suitable. In this way, the heat output can be multiplied. In the case of a barbecue grill, it will be the surface which is to radiate heat for barbecuing. However, under this surface two or more than two layers of heating elements may also be eccentrically arranged in the metal plate to increase the barbecuing heat output. In case of the continuous rolling method according to the invention, this can be achieved in a simple manner by not rolling the heating elements into the centre with respect to the thickness the metal plate.

In another embodiment of the method according to the invention, a plating layer of aluminium or an aluminium alloy applied to another metal having a better thermal conductivity than aluminium is used as the or each layer of aluminium or an aluminium alloy. The other metal is, for example, copper. In this embodiment, the good bondability of layers of aluminium or an aluminium alloy with the aid of diffusion bond and, at the same time, the better thermal conductivity of the other metal is used to enhance the effectiveness of the metal plate in its application as a heating plate.

In one embodiment of the metal plate according to the invention, the layers of aluminium or an aluminium alloy are arranged as core layers between two cover layers of another metal such as steel, stainless steel, copper or titanium. By using suitable cover layers, the metal plate can be optimally adapted to the intended use, for example, as already mentioned above, with regard to a corrosion-resistant application, a heat-resistant application, a food-resistant application, a saltwater-resistant application or the like.

In another embodiment of the metal plate according to the invention the metal plate is, by means of thermal post-processing, brought into a state in which it can be further processed by mechanical reshaping. In this way, as already mentioned above, for example, differently shaped heating plates can be produced using the metal plate without the functional efficiency of the or each heating element being affected.

In another embodiment of the metal plate according to the invention, the metal plate is produced as a rolled product. Such a rolled product can be produced in a continuous rolling process. The metal plate may contain any number of heating elements disposed one behind the other or a continuous long heating element as required. In this way, identical heating elements can be produced, wherein only the metal plate produced as a rolled product will then have to be suitably cut.

In another embodiment of the metal plate according to the invention, the heating element is at least one metal wire provided with an electric insulation. This embodiment of the heating element can be realized in the simplest way if an electric insulation is present on metal wire which can withstand the heat and pressure load during the production of the metal plate according to the invention.

In another embodiment of the metal plate according to the invention, the heating element is formed of a tubular heating element in which at least one heating conductor is embedded in a mineral core enclosed by a tubular metallic sheath. The simplest presently known form of a corresponding heating element is such a tubular heating element formed of a tubular metallic sheath containing a mineral core in which at least one heating conductor is embedded. Likewise two or even more heating conductors may be embedded in this mineral core in a distance to each other. The overall design of the tubular heating element is configured so that it can be wound and transported on rolls like a wire. A customary diameter of a such a tubular heating element is in the range of 3 mm, but smaller or also larger dimensions are also conceivable.

In another embodiment of the metal plate according to the invention at least one row of separate heating elements is embedded in the plate bodies. In this way, for example, a strip-shaped metal plate can be produced which may simply be cut into individual or into groups of individual heating plates as already mentioned above.

In another embodiment of the metal plate according to the invention, at least one temperature sensor per heating element is also embedded in the metal plate. As also already mentioned above, this facilitates the temperature control if the metal plate is used as a hotplate.

In another embodiment of the hotplate according to the invention, at least one heating element is thermally separated from an existing adjacent heating element by means of a notch incorporated in the metal plate. In this way, as also already mentioned above, a ceramic glass cooktop comprising a plurality of heating surfaces can be replaced by a metal plate according to the invention in which different heating surfaces are defined which respectively comprise at least one heating element and are thermally separated from the heating elements of adjacent heating surfaces by notches.

In another embodiment of the metal plate according to the invention, the or each heating element is embedded in the metal plate so that it is helically wound or wound in a meandering pattern. In this embodiment, the shape of the heating element can be selected depending on the intended use of the metal plate.

In another embodiment of the metal plate according to the invention, the or each heating element is embedded eccentrically in relation to the thickness of the metal plate. In this way, it is possible to heat the surface of the metal plate on which heat is required more intensely than the opposing surface.

In another embodiment of the metal plate according to the invention, the or each layer of aluminium or an aluminium alloy is a plating layer applied to another metal having a better thermal conductivity than aluminium. In this way, the good diffusion bondability of aluminium can be combined with the better thermal conductivity of another metal such as, for example, copper, as already described above.

Figure 4:
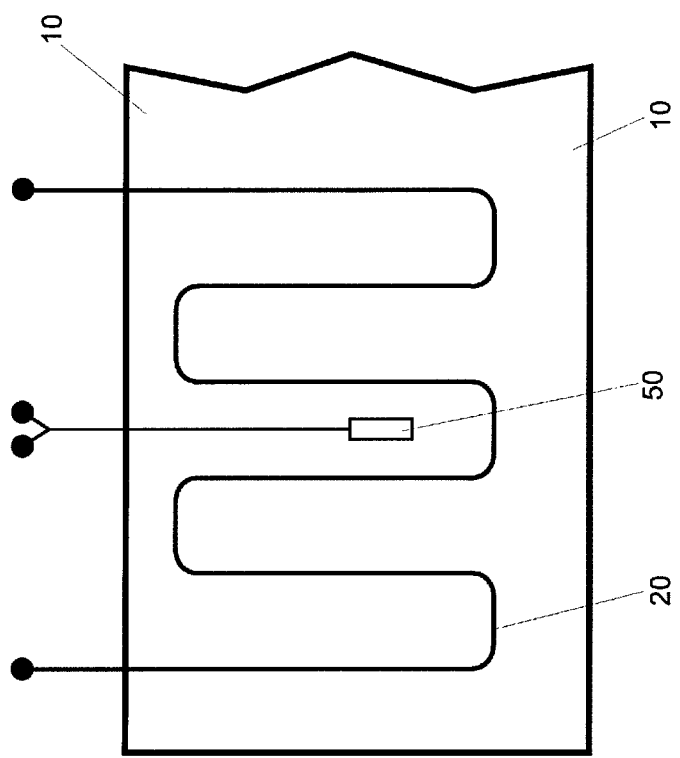
Figure 7:
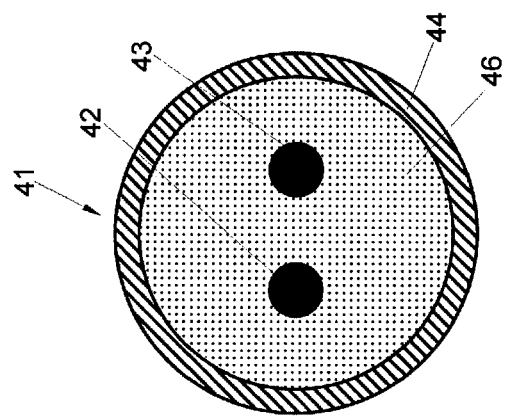
Figure 6:
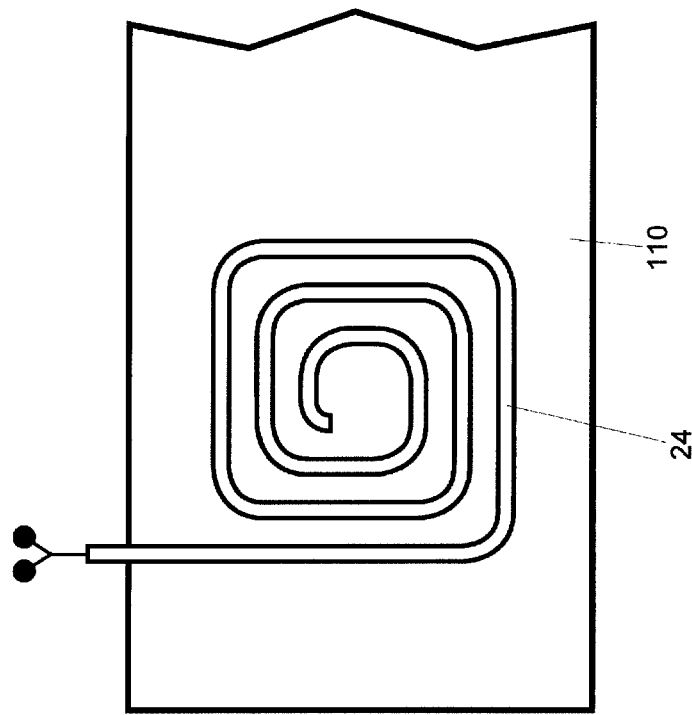

Embodiments of the invention will be described below with reference to the drawings in which:

FIG. 1 shows a sectional view of how two plate bodies are rolled to a metal plate according to the invention comprising an embedded heating element under reduction of the thickness, FIG. 1A shows the rolling of two plate bodies respectively provided with a plating layer on their inner and outer surfaces in the same view as in FIG. 1, FIG. 2 shows the rolling of two plate bodies which are, however, respectively provided with a metallic cover layer on their outer surfaces in the same view as in FIG. 1, FIG. 3 shows a rolling process in which two plate bodies of different thicknesses are rolled to a metal plate in the same view as in FIG. 1, FIG. 3A shows a rolling process in which three plate bodies are rolled to a metal plate in the same view as in FIG. 1, FIG. 4 shows a part of a metal plate comprising a rolled-in heating element, a temperature sensor being embedded in the metal plate as well, FIG. 5 shows a cross sectional view of a heating element consisting of a tubular heating element in which a heating conductor is embedded in a mineral core enclosed by a tubular metallic sheath, FIG. 6 shows a metal plate according to the invention in which a helically wound heating element is embedded, FIG. 7 shows a cross section of a heating element consisting of a tubular heating element in which two heating conductors are embedded in a mineral core enclosed by a tubular metallic sheath, and FIG. 8 shows a part of a metal plate according to the invention in which four heating elements are embedded and thermally separated from a respectively adjacent heating element by means of a notch incorporated in the metal plate, the notch being additionally shown as a separate unit in an enlarged scale.

The invention relates to the production of a metal plate comprising at least one embedded heating element having a better overall thermal conductivity and a wider field of application. The steps to be performed during the production of the metal plate which are identical to those of the abovementioned known method according to the US patent specifications discussed in the beginning such as the cleaning of the metal surfaces, the thermal pre-treatment of the plate bodies and the rolling of the same to obtain a bilateral diffusion bond and, if required, a thermal finishing treatment will not be described in detail here. However, it is to be noted that if plate bodies of aluminium are joined together using the method according to the invention, the surfaces of each aluminium layer are heated to a temperature which is higher the re-crystallisation temperature of the aluminium but lower than the melting point of the aluminium before being pressed against each other. Finally the metal plate is annealed whereupon it can then be further processed and reshaped in the process. To this end, reference is also made to the U.S. Pat. Nos. 3,261,724, 3,210,840, and 3,350,772 which are concerned with rolling methods for plating aluminium with stainless steel.

FIG. 1 shows a sectional view of how two plate bodies 10, 12 are rolled to form a metal plate 100 according to the invention comprising an embedded heating element 20 and, in addition, an embedded temperature sensor 50 under reduction of the thickness. The rolling is then performed in a roll gap 30 between two rolls 32, 34 of a rolling mill otherwise not shown.

In the embodiment according to FIG. 1, the plate bodies 10, 12 consist of aluminium or an aluminium alloy. It is sufficient that the plate bodies 10, 12 have a layer of aluminium or an aluminium alloy at least on the sides facing each other which can be seen to the right of the roll gap 30 in FIG. 1. The remaining part of the plate bodies 10, 12 could be made of another metal as it is the case in other embodiments of the metal plate according to the invention described further below.

FIG. 1A shows the rolling of two plate bodies 10', 12' respectively provided with a plating layer 13, 14 or 15, 16 on their inner and outer surfaces in the same view as in FIG. 1. In this embodiment of the invention the two plate bodies 10, 12 have been replaced by the plate bodies 10' or 12' which are, on the sides facing each other, provided with the layer 13 or 14 of aluminium or an aluminium alloy respectively applied to another metal having a better thermal conductivity than aluminium as a plating layer of aluminium or an aluminium alloy. This other metal may, for example, be copper. In FIG. 1A, it can be seen that the plate bodies 10' and 12' are respectively provided with a cover layer 15 or 16 on the outer side. The cover layers 15, 16 may, in fact, be plating layers of aluminium or an aluminium alloy like the two inner plating layers 13 and 14. However, they may instead be two cover layers made of another metal such as steel, stainless steel, or titanium. If the core layers of the plate bodies 10', 12' adjacent to the plating layers 13 and 14 are not made of copper, the two cover layers 15 and 16 may respectively consist of copper FIG. 2 shows the rolling of two plate bodies 10, 12 which are, however, respectively provided with a metallic cover layer 15 or 16 on their outer surfaces in a view identical to in FIG. 1. In this embodiment of the invention, the two plate bodies 10, 12 have no plating layer on their inner sides facing each other but are only provided with the cover layers 15, 16 on the outer side. In this embodiment, the layers of aluminium or an aluminium alloy forming the plate bodies 10, 12 are arranged as core layers between the two cover layers 15, 16 made of another metal such as steel, stainless steel, copper or titanium.

FIG. 3 shows a rolling process in which two plate bodies 10", 12" of different thicknesses are rolled to form a metal plate 130 in a view identical to in FIG. 1. FIG. 3A shows a rolling process in which three plate bodies 10, 11, 12 are rolled to form a metal plate 130A in a view identical to in FIG. 1.

The method by means of which the plate bodies 10, 12 are rolled to form a metal plate 100 (FIG. 1) or 100A (FIG. 1A) or 110 (FIG. 6) or 120 (FIG. 2) or 130 (FIG. 3) or 130A (FIG. 3A) is described further below. The description is therefore limited to the condition of the plate bodies in the state in which they are located on the right side of the roll gap 30 in the illustration in FIGS. 1 to 3A.

At least one heating element 20 (FIGS. 1, 1A, 2, 3 and 3A) is respectively arranged in a plane between the plate bodies 10, 12 or 10', 12' or 10", 12" or 10, 11 and 12, or at least two heating elements 20, 22 are arranged in two planes on top of each other (FIG. 3A).

In the finished metal plate 100, 100A, 110, 120, 130, 130A extending on the left side of the roll gap 30 in the illustration in FIGS. 1 to 3 the plate bodies respectively have, on the sides facing each other, at least one layer 15 of aluminium or an aluminium alloy which, with the exception of the contact points between the plate bodies and the heating elements 20, 22, 24, are joined together over their entire surfaces in a positively bonded manner by means of a bilateral diffusion bond as is the case in the embodiments according to FIGS. 1, 2, 3, and 3A in which the layer 15, however, cannot be seen because the entire material of the metal plate consists of aluminium or an aluminium alloy. The layer 15, on the other hand, can be seen in FIG. 1A since it originates from the two plating layers 13, 14 of aluminium or an aluminium alloy adjoined by another metal such as copper.

The establishment of the diffusion bond is described in more detail together with the process. The metal plates 100, 100A, 110, 120, 130 and 130A which were produced as a rolled product according to the above description are brought into a state by means of a thermal finishing treatment in which they can be further processed by mechanical reshaping.

The heating elements 20, 22 are respectively at least one metal wire (not shown) provided with an electric insulation, or each heating element consists of a tubular heating element 40 in which the at least one heating conductor 42 is embedded in mineral core 46 enclosed by a tubular metallic sheath 44 as shown in FIG. 5. Instead of a heating conductor 42, two heating conductors 42 and 43 may also be embedded in the tubular heating element 40 in the mineral core 46 as shown in FIGS. 6 and 7. FIG. 6 shows a metal plate 110 in which a helically wound heating element 24 is embedded.

In the embodiment according to FIG. 2, the tubular heating element 40 may have an outer diameter of 3.2 mm, and the finished metal plate 120 may have a thickness of 10 mm. Here, the two cover layers 15, 16 have a thickness of 1 mm, respectively. Each plate body 10, 12 including its cover layer 15 or 16 may, for example, have a thickness of 7 mm prior to the rolling process. If the rolls 32, 34 have a diameter of 300 mm, respectively, each roll will contact the plate bodies 10, 12 on approximately one twelfth of its circumference.

The method according to the invention for producing a metal plate having at least one embedded heating element will now be described in more detail with reference to FIG. 1.

In a first step at least one heating element 20 (or 24) is arranged between at least two plate bodies 10, 12 which are not (according to the state of the art in the document DE 10 2007 054 071 B4) provided with recesses for accommodating the or each heating element 20. In a second step, the or each heating element 20 (or 24) is embedded in direct contact in at least two plate bodies, namely, in FIG. 1, in the plate bodies 10, 12, by compressing and material displacement of the plate bodies. In a third step, the two plate bodies 10, 12 are joined together in a positively bonded manner. The at least two plate bodies 10, 12 which respectively have at least one layer of aluminium or an aluminium alloy (in the embodiment according to FIG. 1, they only consist of aluminium or an aluminium alloy, respectively) on the sides facing each other are heat pre-treated at a temperature which is at least equal to the re-crystallisation temperature of the aluminium or the aluminium alloy and then pressed against each other by rolling to effect the embedding of the or each heating element 20 (or 24) in the plate bodies 10, 12 and a reduction of the thickness of the layers in which the layers enter into a bilateral diffusion bond in the area of their sides contacting each other whereby the plate bodies 10, 12 are joined together over their entire surfaces in a positively bonded manner to form the metal plate 100 (or 110, FIG. 6) to be produced. The reduction of the thickness is realised by an appropriate setting of the roll gap 30. The reduction of the thickness of the layers of aluminium or an aluminium alloy is to amount to a maximum of 25% in relation to the overall thickness prior to the compression (in FIG. 1, the right side of the rolls 32, 34).

In the process, at least one row of separate heating elements 20 (or 24) may be embedded in the plate bodies, i.e., in a single plane as is the case in the embodiments according to FIGS. 1, 1A, 2, and 3. In addition, at least one temperature sensor 50 per heating element may be simultaneously embedded in the plate bodies, for example, 10, 12 or 10', 12' as shown in FIG. 4. Each heating element is, as, for example, the heating element 20, wound in a meandering form as shown in FIG. 4, or, like the heating element 24, arranged between the plate bodies such as, for example, the plate bodies 10, 12 in FIG. 1, in a helically wound manner as shown in FIG. 6. If the plate bodies 10, 12 are fed through the roll gap 30, the heating element 20 (or 24) is embedded in the plate bodies 10, 12 under a material displacement of the plate bodies 10, 12 as can be seen in the result, for example, in FIG. 1 to the left of the roll gap 30. Heating elements 20 wound in a meandering pattern and helically wound heating elements 24 may also be embedded in a metal plate together (not shown).

FIG. 8 shows a part of a metal plate 100 in which four heating elements 20 are embedded and thermally separated from a respectively adjacent heating element 20 by means of a notch 55 incorporated in the metal plate. The notch 55 is also shown as a separate unit in a larger scale in FIG. 8. The heating elements 20 are embedded in the plate bodies 10, 12 in two rows in one plane as can be seen in FIG. 8. After the rolling process, the notch 55 is incorporated in the plate body 12.

By applying the method according to the invention, the or each heating element 20 can be eccentrically embedded in relation to the thickness of the metal plate 100 (or of any other metal plate described here). According to the illustration in FIG. 3, two plate bodies 10", 12" having different thicknesses may be used for this purpose so that the heating element 20 will automatically come to be positioned in a plane which is located eccentrically in relation to the thickness the metal plate 130.

The eccentric arrangement of the heating elements may be effected in more than one plane, for example in two eccentric planes as in the embodiment according to FIG. 3A. Here, three plate bodies 10, 11 and 12 having approximately the same thickness are used. Heating elements 20 or 22 are arranged between the sides of these plate bodies facing each other. In the finished metal plate 130A, the heating elements 20 are arranged in an eccentric plane located closer to the bottom surface of the metal plate 130A, and the heating elements 22 are arranged in an eccentric plane located closer to the top surface of the metal plate 130A.

In the embodiment according to FIG. 3A, in fact, three plate bodies 10, 11 and 12 of an approximately equal thickness are used. However, more than three plate bodies may be used, and in principle, the plate bodies may have different thicknesses.

By way of example, the finished metal plate 100 is made of the two plate bodies 10, 12 which have surfaces not provided with recesses on the sides facing each other. The heating element 20 (and/or 24) is embedded in the plate bodies 10, 12 only by material displacement. The plate bodies respectively have at least one layer of aluminium or an aluminium alloy at least on the sides facing each other such as, for example, the plating layers 13, 14 according FIG. 1A, which, with the exception of the contact points between the plate bodies 10, 12 or 10', 12' and the heating elements 20, are joined together over their entire surfaces in a positively bonded manner in the finished metal plate 100 or 100A.

LIST OF NUMERALS

10, 10', 10" plate body
11 plate body
12, 12', 12" plate body
13 plating layer
14 plating layer
15 cover layer
16 cover layer
20 heating element
22 heating element
24 heating element
30 roll gap
32 roll
34 roll
40 tubular heating element
41 tubular heating element 42 heating conductor
43 heating conductor
44 metallic sheath
46 core
50 temperature sensor
55 notch
100 metal plate
100A metal plate
110 metal plate
120 metal plate
130 metal plate
130A metal plate

What is claimed is:

1. A method for producing a metal plate comprising at least one embedded heating element by means of the following steps:
   a) arranging at least one heating element between at least two plate bodies not provided with recesses for accommodating the or each heating element,
   b) embedding at least one heating element in direct contact in at least two plate bodies by compressing and material displacement of the plate bodies, and
   c) forming at least partly positively bonded interconnection of the plate bodies,
   characterised in that at least two plate bodies respectively comprising at least one layer of aluminum or an aluminum alloy on their sides facing each other are thermally pre-treated at a temperature which is at least equal to the re-crystallisation temperature of the aluminum or the aluminum alloy and then pressed against each other by rolling to effect the embedding of the or each heating element in the plate bodies and a reduction of the thickness of the layers in which the layers enter into a bilateral diffusion bond in the area of their sides contacting each other and the plate bodies are thereby joined together over their entire surfaces in a positively bonded manner to form metal plate to be produced.

2. The method according to claim 1, characterised in that the reduction of the thickness of the layers of aluminum or an aluminum alloy amounts to a maximum of 25% in relation to the overall thickness of these layers before they are pressed against each other.

3. The method according to claim 1, characterised in that the layers of aluminum or an aluminum alloy are disposed as core layers between two cover layers of another metal such as steel, stainless steel, copper, or titanium.

4. The method according to claim 1, characterised in that the metal plate is brought into a state by a thermal finishing treatment in which it can be further processed by mechanical reshaping.

5. The method according to claim 1, characterised in that at least one row of separate heating elements is embedded in the plate bodies.

6. The method according to claim 5, characterised in that, in addition, at least one temperature sensor per heating element is simultaneously embedded in the plate bodies.

7. The method according to claim 1, characterised in that a tubular heating element is used as said at least one heating element in which at least one heating conductor is embedded in a mineral core enclosed by a tubular metallic sheath.

8. The method according to claim 1, characterised in that a notch is incorporated in one of the plate bodies during or after rolling to separate at least one heating element from an existing adjacent heating element.

9. The method according to claim 1, characterised in that at least one said heating element is arranged between the plate bodies so that it is helically wound or wound in a meandering pattern.

10. The method according to claim 1, characterised in that at least one said heating element is eccentrically embedded in relation to the thickness the metal plate.

11. The method according to claim 1, characterised in that a plating layer of aluminum or an aluminum alloy applied to another metal having a higher thermal conductivity than aluminum is used as said at least one layer of aluminum or an aluminum alloy.

12. A metal plate produced according to a method according to any one of the preceding claims 1 to 11, consisting of at least two plate bodies not provided with recesses in which at least one heating element was embedded only by material displacement, characterized in that the plate bodies respectively comprise at least one layer of aluminum or an aluminum alloy on their sides facing each other which are, with the exception of the contact points between plate bodies and the heating element(s), joined together over their entire surfaces in a positively bonded manner by a bilateral diffusion bond.

13. The metal plate according to claim 12, characterised in that the layers of aluminum or an aluminum alloy are arranged as core layers between two cover layers of another metal such as steel, stainless steel, copper or titanium.

14. The metal plate according to claim 12, characterised in that the metal plate is brought into a state in which it can be further processed by mechanical reshaping by a thermal finishing treatment.

15. The metal plate according to claim 12, characterised in that the metal plate is produced as a rolled product.

16. The metal plate according to claim 12, characterised in that at least one said heating element is a metal wire provided with at least an electrical insulation.

17. The metal plate according to claim 12, characterised in that at least one said heating element consists of a tubular heating element in which the at least one heating conductor is embedded in a mineral core enclosed by a tubular metallic sheath.

18. The metal plate according to claim 12, characterised in that at least one row of separate heating elements is embedded in the plate bodies.

19. The metal plate according to claim 12, characterised in that at least one temperature sensor per heating element is also embedded in the metal plate.

20. The metal plate according to claim 12, characterised in that at least one heating element is thermally separated from an existing adjacent heating element by a notch incorporated in the metal plate.

21. The metal plate according to claim 12, characterised in that at least one said heating element is embedded in the metal plate so that it is helically wound or wound in a meandering pattern.

22. The metal plate according to claim 12, characterised in that at least one said heating element is eccentrically embedded in relation to the thickness the metal plate.

23. The metal plate according to claim 12, characterised in that at least one said layer of aluminum or an aluminum alloy is a plating layer of aluminum or an aluminum alloy applied to another metal having a higher thermal conductivity than aluminum.

* * * * *